United States Patent
Bottorff et al.

(10) Patent No.: US 11,349,761 B2
(45) Date of Patent: May 31, 2022

(54) COST EFFECTIVE CONGESTION ISOLATION FOR LOSSLESS ETHERNET

(71) Applicant: Hewlett Packard Enterprise Development LP, Houston, TX (US)

(72) Inventors: Paul Bottorff, Roseville, CA (US); Mark Gravel, Roseville, CA (US); Mehrnaz Sharifian, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 271 days.

(21) Appl. No.: 16/297,447

(22) Filed: Mar. 8, 2019

(65) Prior Publication Data
US 2020/0287833 A1 Sep. 10, 2020

(51) Int. Cl.
| H04L 47/11 | (2022.01) |
| H04L 47/30 | (2022.01) |
| H04L 47/6275 | (2022.01) |
| H04L 45/7453 | (2022.01) |

(52) U.S. Cl.
CPC .......... *H04L 47/11* (2013.01); *H04L 45/7453* (2013.01); *H04L 47/30* (2013.01); *H04L 47/6275* (2013.01)

(58) Field of Classification Search
CPC ..... H04L 47/11; H04L 47/122; H04L 47/125; H04L 47/30; H04L 47/00
See application file for complete search history.

(56) References Cited

U.S. PATENT DOCUMENTS

| 7,907,518 | B2 | 3/2011 | Kuhl et al. |
| 8,989,009 | B2 | 3/2015 | Xiong |
| 9,160,678 | B2 | 10/2015 | DeCusatis et al. |
| 2015/0257035 | A1* | 9/2015 | Grinshpun ........ H04W 28/0284 370/235 |
| 2017/0048144 | A1* | 2/2017 | Liu ...................... H04L 12/413 |
| 2018/0068059 | A1* | 3/2018 | Odenheimer .......... G16B 30/00 |
| 2020/0186471 | A1* | 6/2020 | Shen .................. H04L 47/6275 |

OTHER PUBLICATIONS

NPL: Proposed Project IEEE P802.1Qcz, Congestion Isolation, 2018.*

(Continued)

*Primary Examiner* — Abdelillah Elmejjarmi
(74) *Attorney, Agent, or Firm* — Sheppard Mullin Richter & Hampton LLP

(57) ABSTRACT

A cost effective congestion isolation for lossless Ethernet utilizing random selection is provided. Upon detecting congestion at one of its egress ports, a downstream device randomly selects a data packet received at one or more of its ingress ports for isolation in a congested priority queue at the ingress port. The downstream device sends a congestion isolation message, including a list of isolation hashes to an upstream device to identify data packets selected for isolation. Upon receipt, the upstream device identifies data packets selected for isolation and begins to queue such packets in a congested priority queue of the upstream device. When priority-based flow control is triggered, the upstream device ceases transmission of packets in the congested priority queue only, while allowing continued transmission of non-isolated data packets.

18 Claims, 10 Drawing Sheets

(56) References Cited

OTHER PUBLICATIONS

Duato, et al., "A New Scalable Cost-Effictive Congestion Management Strategy for Lossless Multistage Interconnection Networks", Proceedings of the 11th International Symposium on High-Performance Computer Architecture, 2005, 12 pages.

Escudero-Sahuquillo et al., "Efficient and Cost-Effective Hybrid Congestion Control for HPC Interconnection Networks", Apr. 2013, IEEE Transaction on Parallel and Distributed Systems, vol. X (X), pp. 1-12.

IEEE, IEEE 802 Nendica Committee Report:, "The Lossless Network for Data Centers", 2018, 29 pages.

Montazeri et al., "Homa : A Receiver-Driven Low-Latency Transport Protocol Using Network Priorities", Mar. 26, 2018, pp. 1-19.

Cheng et al., Isolating Mice and Elephant in Data Centers, Jun. 1, 2016, pp. 1-14, Retrieved from the Internet o Jan. 8, 2019 from URL: <arxiv.org/pdf/1605.07732.pdf>.

Chrysos et al., Discharging the Network from Its Flow Control Headaches: Packet Drops and Hol Blocking, Nov. 20, 2012, pp. 1-15, Retrieved from the Internet on Jan. 8, 2019 from URL: <users.ics.forth.gr/~nchrysos/papers/nchrysos_camera_ready_TON.pdf>.

Congdon, Paul, Proposed Project IEEE P802.1Qcz Congestion Isolation, pp. 1-27, Retrieved from the Internet on Jan. 8, 2019 from URL: <datatracker.ietf.org/meeting/101/materials/slides-101-tsvwg-sessb-41-congestion-isolation-in-ieee-8021-00>.

\* cited by examiner

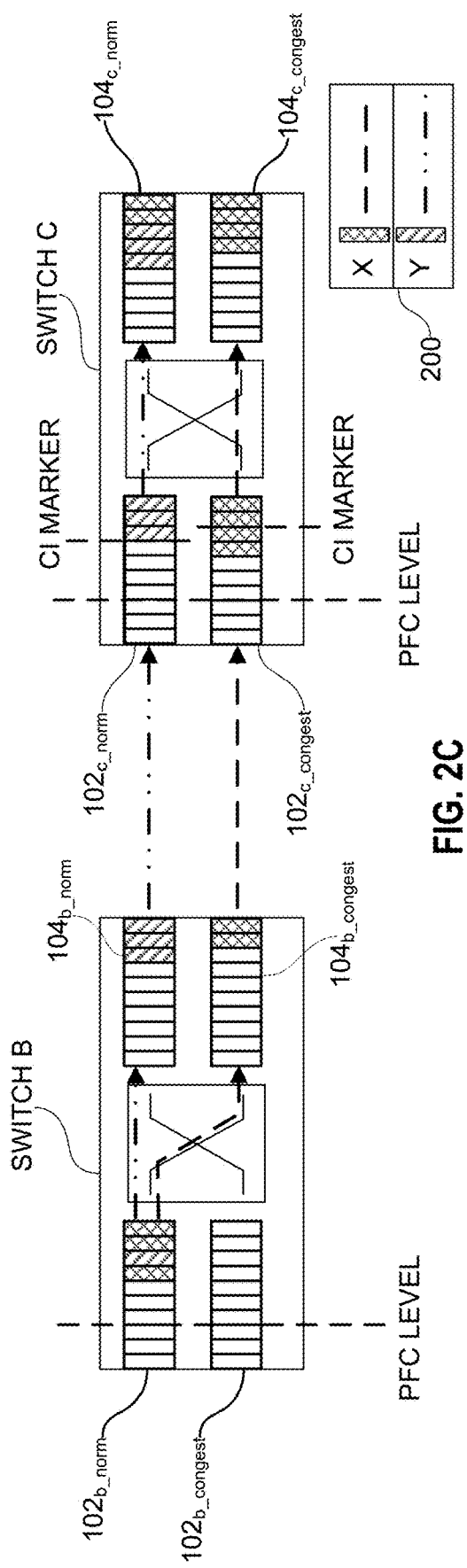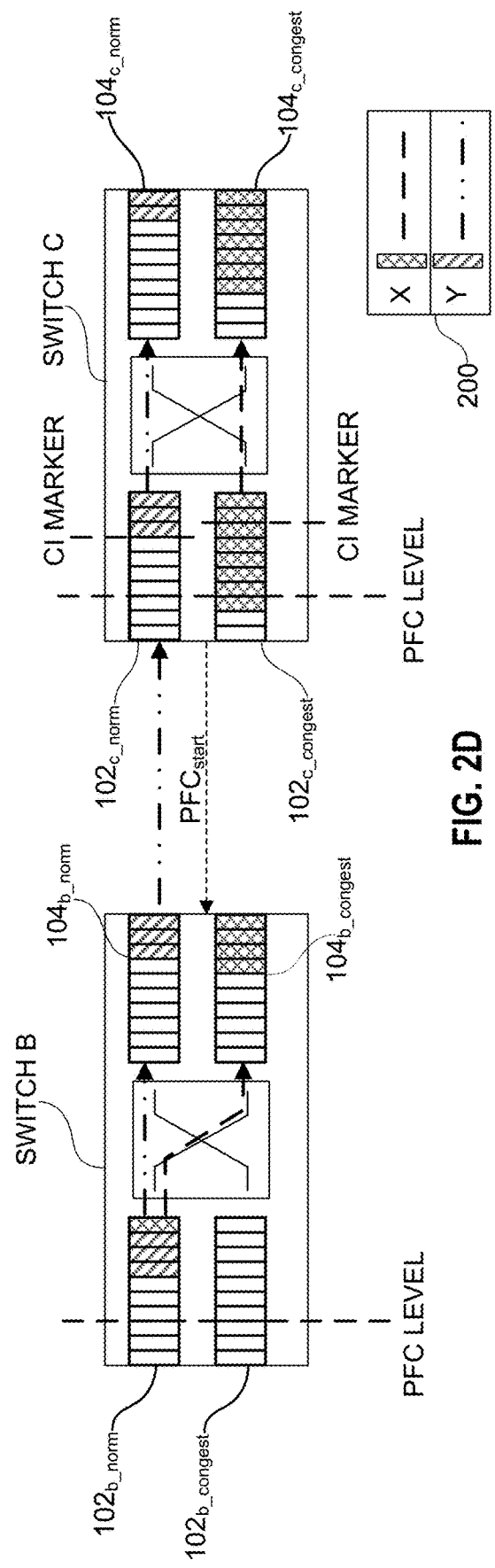
FIG. 2C
FIG. 2D

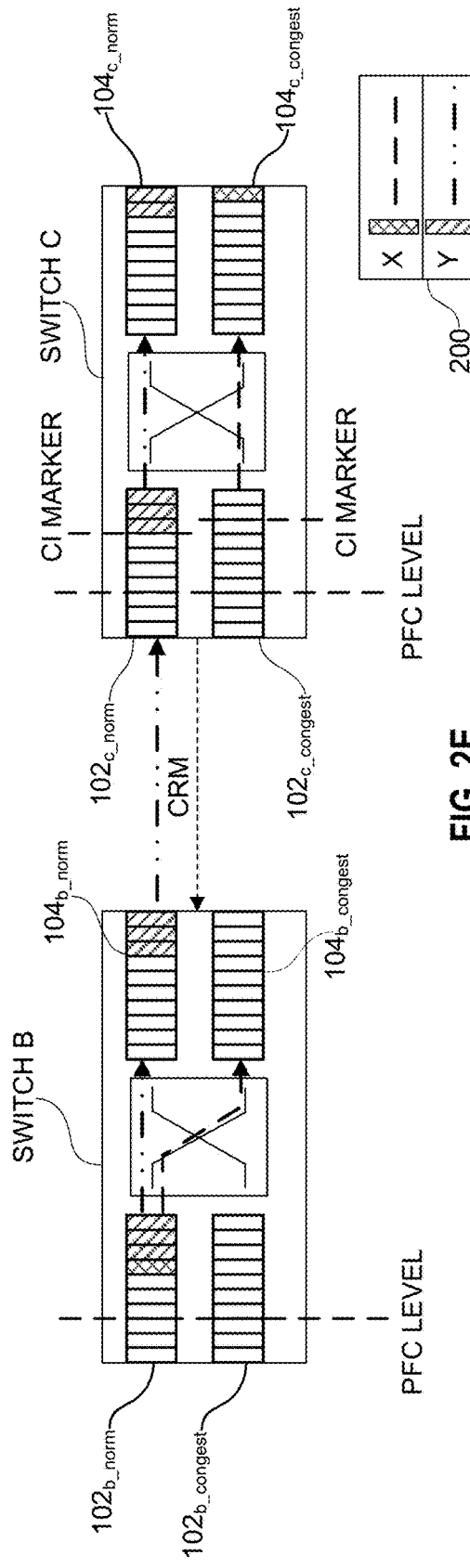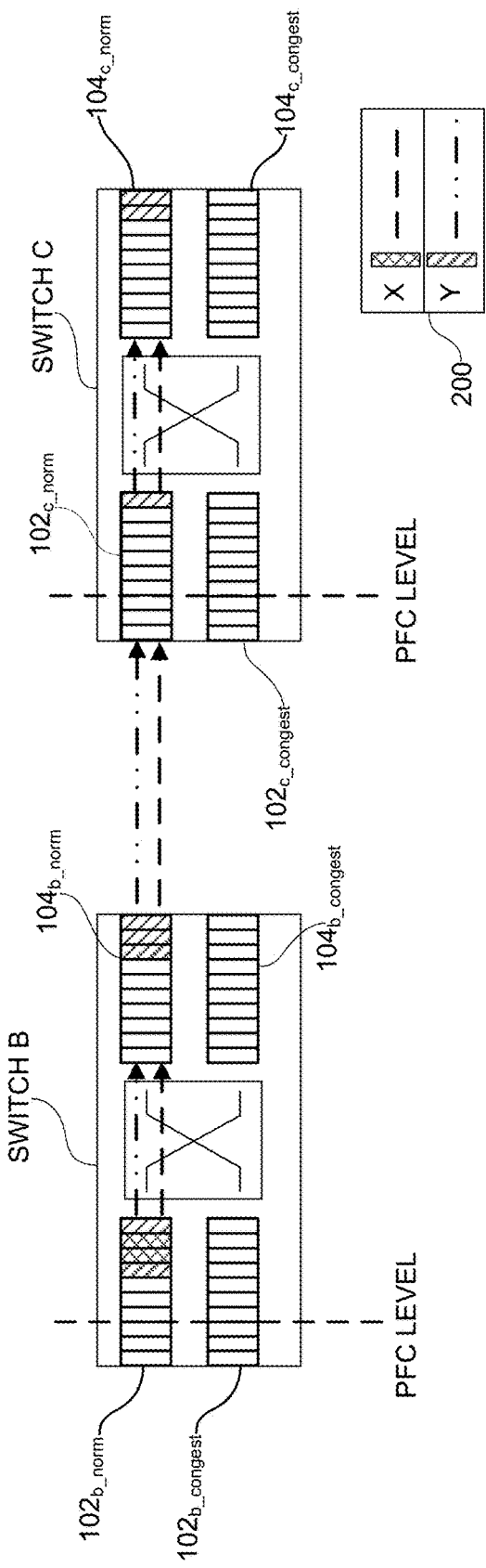
FIG. 2E
FIG. 2F

COST EFFECTIVE CONGESTION ISOLATION FOR LOSSLESS ETHERNET

BACKGROUND

Network overload, or as it is commonly called network congestion, happens as a result of collisions between flows exceeding the capacity of the network buffers. Transport protocols such as Transmission Control Protocol (TCP) are commonly used to control network congestion by adjusting the load offered to the network based on feedback from lost or marked packets.

Lossless Ethernet (e.g., data center bridging) refers to enhancements to the Ethernet protocol for use within datacenters to allow Ethernet to be used for storage and high-performance computing (e.g., clustering). These enhancements attempt to eliminate packet loss due to queue overflow and to allow bandwidth allocation on different links in the network. Current data center fabrics, such as Fiber Channel over Ethernet (FCoE) and Remote Direct Memory Access over Ethernet (RDMA), are sensitive to frame loss. Lossless Ethernet maintains feedback for TCP and RDMA using explicit congestion notification bits encoded within data packets rather than using packet discard. In some examples, congestion is the primary cause of loss and delay in such large scale, low-latency, lossless Ethernet datacenters. By coupling congestion notification (e.g., Explicit Congestion Notification (ECN), Quantized Congestion Notification (QCN), etc.) with priority-based flow control, lossless Ethernet prevents packet loss.

BRIEF DESCRIPTION OF THE DRAWINGS

The present disclosure, in accordance with one or more various embodiments, is described in detail with reference to the following figures. The figures are provided for purposes of illustration only and merely depict example embodiments.

FIG. 2C illustrates a third part of the example congestion isolation procedure in accordance with embodiments of the technology disclosed herein.

FIG. 2D illustrates a fourth part of the example congestion isolation procedure in accordance with embodiments of the technology disclosed herein.

FIG. 2E illustrates a firth part of the example congestion isolation procedure in accordance with embodiments of the technology disclosed herein.

FIG. 2F illustrates a sixth part of the example congestion isolation procedure in accordance with embodiments of the technology disclosed herein.

Figure 1:
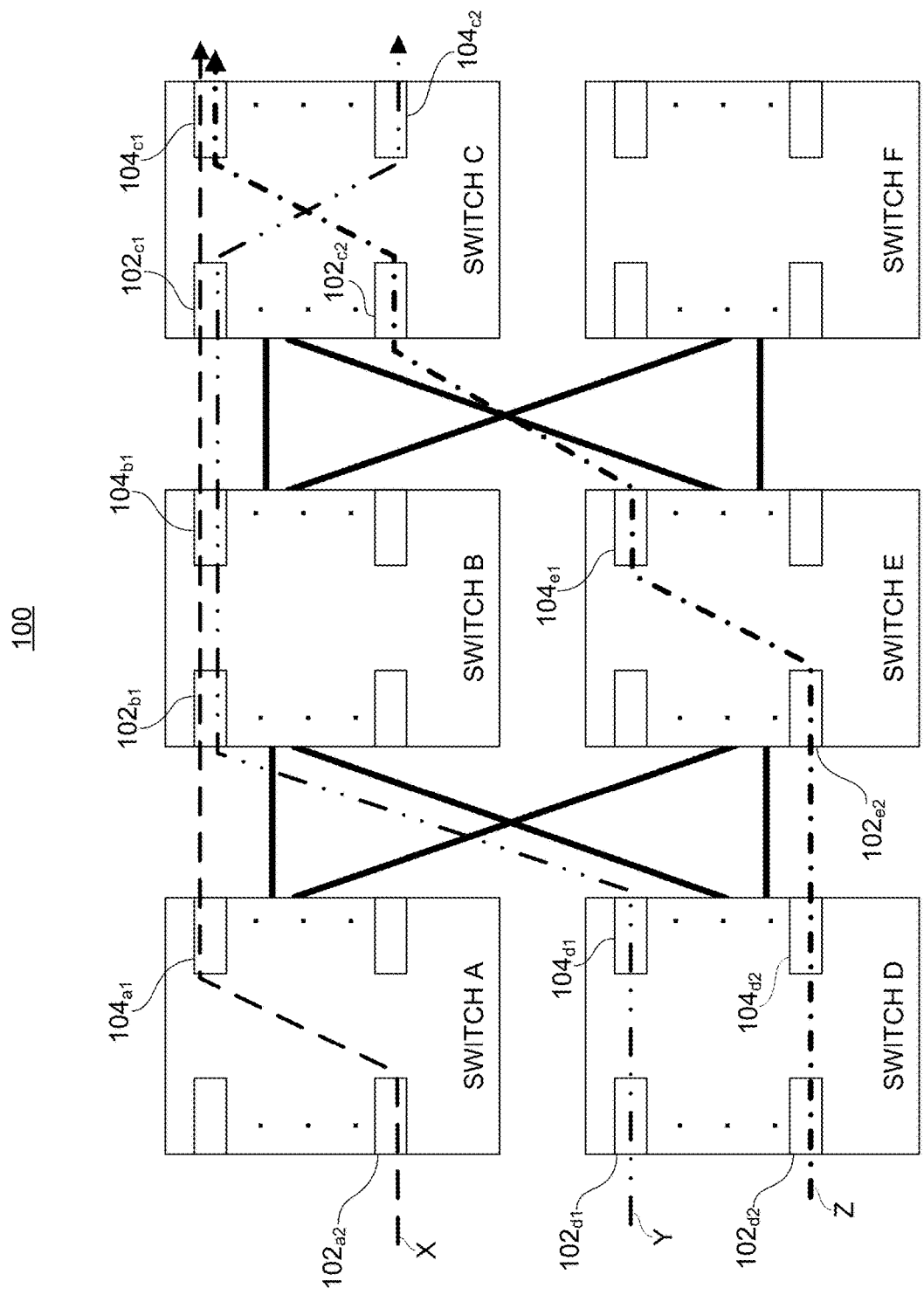
FIG. 1 is an example environment in accordance with embodiments of the technology disclosed herein.

The figures are not exhaustive and do not limit the present disclosure to the precise form disclosed.

DETAILED DESCRIPTION

A network path may be comprised of multiple hops between a source and a destination. Congestion occurs when upstream devices transmit packets faster than those packets can be accepted by the downstream devices within the forwarding. An upstream device is any network switch or other device which is sending data traffic to another device from one of the upstream device's outputs (i.e., egress ports), whereas a downstream device is any network switch or other device which receives data traffic from another device (i.e., the upstream device) at one of the downstream device's inputs (i.e., ingress ports). The originating source of data traffic within a network may be considered the first upstream device, while the ultimate destination of the data traffic may be considered the last downstream device. Every device within the network may act as both an upstream device or a downstream device, depending on the direction of traffic.

When the downstream device runs out of space in its buffers, it may begin to silently drop additional incoming packets, resulting in lost packets. For applications which require lossless forwarding, it is important to implement a flow control that includes feedback regarding buffer capacity from the downstream device to the upstream device. Lossless forwarding may be necessary for applications that cannot tolerate the latency required for re-transmissions, suffer significant performance impacts when attempting to recover lost packets, or simply fail as a result of network packet loss, among other reasons.

Although TCP allows for adjusting load offered to the network based on feedback from lost or marked packets, TCP requires multiple round trip delay times to adjust to congestion events. For TCP and other end-to-end transport protocols to be effective, the network must have sufficient buffers to withstand short term overload until the transport protocol throttles the sources, and the flows themselves must be long lived relative to the network round trip time. However, both of these requirements are frequently violated in data center and storage networks.

Priority-based flow control is an asynchronous approach wherein each switch continues to send messages until it receives a message to stop transmission, unlike the credit-based TCP approach. Priority-based flow control functions on priority classes. When the queue at an ingress port of a downstream device reaches a certain threshold of its capacity, the downstream device sends a priority flow control message to the upstream device to inform the upstream device to stop sending packets with a certain priority. At that point, the upstream device will identify when it has data packets of that class ready to be sent through one or more of its egress ports and will pause transmission of data packets at the one or more egress ports until a resume message is sent by the downstream device (i.e., an indication the congestion situation has been mitigated).

Although priority-based flow control helps prevent packet loss, it has negative consequences. Each port of a network switch or router may have different queues associated with each priority class. Priority-based flow control blocks all traffic passing through a port, including both congesting flows and well-behaved flows (i.e., the offending flows and flows which are not congested). When the upstream device receives the message from the downstream device, indicating to stop forwarding data packets of a particular priority class, the upstream device stops transmission of all queues of that priority class, but not of transmission of data packets from queues of other priority classes. This type of blockage caused by priority-based flow control is called head-of-line blocking (HOL blocking). HOL blocking causes deteriorated network performance by stopping the forward progress of well-behaved flows.

There are a variety of solutions addressing the HOL blocking problem caused by priority-based flow control. Some solutions employ packet discard algorithms, whereby packets are simply dropped once the buffer is full. Other solutions utilize per-flow queueing, a technique whereby each data flow is treated separately. However, such approaches require a separate queue for each data flow handled by the switch. For per-flow queueing, content addressable memories (CAMs) are also required for each queue to ensure proper routing. These solutions may not be appropriate within the datacenter due to the packet drops that may be caused by these solutions. Moreover, per-flow queueing is prohibitively expensive, requiring CAMs and maintaining a variety of statistics related to the flows. Per-flow queueing further increases the complexity of the control plane, making less applicable to datacenters due to difficultly in software scaling.

Embodiments of the technology disclosed herein are directed to methods and systems for cost effective congestion isolation. The technology of the present disclosure addresses the deficiencies of priority-based flow control without changing how priority-based flow control operates, and without the need for packet discard or expensive per-flow queuing. In some examples, one or more buffers at an ingress and egress port of each switch is designated as a congested priority queue. When the downstream device detects congestion at an egress port, the downstream device randomly selects one or more flows to isolate and begins to queue data packets of those flows into a congested queue. A hash bucket is computed for each received data packet by the downstream device, which is used to identify data packets to isolate upon receipt at an ingress port from an upstream device. The downstream device also sends one or more congestion isolation messages (CIMS) to the upstream device. Each CIM contains an isolation identifier, which may include the computer hash bucket. The upstream device uses the isolation identifier to identify the flow(s) randomly chosen to be isolated and begins to isolate those data packets by queuing those packets into a congested queue of the upstream device. Implementing embodiments of the present disclosure enable a low cost method of congestion isolation without unnecessarily impacting well-behaving flows through blocking all traffic at an egress port. Specifically, embodiments of the present disclosure address the issue of HOL blocking caused by priority-based flow control. By randomly isolating data flows, the HOL blocking issue is minimized, increasing the chance that well-behaving data flows will still be forwarded.

FIG. 1 illustrates an example environment 100 in which embodiments of the technology disclosed herein can be implemented. Example environment 100 is intended for illustration only and should not be interpreted as limiting the scope of the subject matter disclosed herein to any specific environment. Moreover, although one network topology is illustrated, a person of ordinary skill in the art would understand the technology disclosed herein to be applicable in any network topology.

Referring to FIG. 1, example environment 100 includes six network switches A-F. Each switch A-F contains one or more ingress ports 102 and one or more egress ports 104. In various embodiments, switches A-F may be one or more network components, such as (but not limited to) a network bridge, network switch, a multilayer switch, a router, a repeater hub, or any other packet forwarding device implemented within a network. Although not illustrated in FIG. 1, a person of ordinary skill in the art would know the standard components of a network switch, including one or more processors, one or more memory components, one or more network interfaces, read only memory (ROM) components, or any other component discussed with respect to FIG. 7.

As illustrated, each switch A-F is communicatively coupled to other switches as illustrated by the solid lines. In various embodiments, the solid lines may represent a one-to-one architecture, wherein each egress port 104 of one switch is communicatively coupled to a corresponding ingress port 102 of another switch. In other embodiments, the solid lines may represent a many-to-one architecture or a one-to-many architecture. A person of ordinary skill in the art would understand that the type of architecture employed does not impact the applicability of the technology disclosed herein.

During operation, various data flows are routed through the switches A-F of the environment 100, such as data flows X, Y, and Z. Data flows may be routed through the environment 100 may take various different paths, depending on the routing decisions made by the network. In various embodiments, routing decisions are designed to traverse the network in the shortest number of hops possible from a source to an endpoint. In other embodiments, different routing methods may be implemented based on the requirements of the network (e.g., high-availability, etc.). Moreover, although discussed with respect to HOL blocking caused by application of priority-based flow control, such description is intended for explanation purposes only, to describe the technology disclosed herein. A person of ordinary skill in the art would understand that the technology disclosed herein may operate independently of the congestion mitigation strategy (e.g., priority-based flow control) employed within the network.

FIG. 1 illustrates an example routing for data flows X, Y, and Z in accordance with various embodiments of the technology disclosed herein. For ease of discussion each of the ingress and egress ports of the switches A-F are illustrated as a unitary element. A person of ordinary skill in the art would understand that ingress and egress ports of devices in accordance with the present disclosure may contain one or more buffers for buffering data packets received prior to forwarding. For example, a person of ordinary skill in the art would understand that ingress and egress ports of the various switches A-F may contain a number of buffers based on the priority scheme implemented within the network. FIG. 1 is intended for illustration purposes of how data flows generally flow through network switches only, and should not be interpreted as limiting the scope of the subject matter discussed herein to specific network devices having unitary ports.

As illustrated in FIG. 1, data flow X enters switch A (e.g., upstream device 1 for data flow X) through ingress port $102_{a2}$ and is routed out egress port $104_{a1}$ to ingress port $102_{b1}$ of switch B (e.g., downstream device 1 for data flow X). Data flow X is routed from egress port $104_{b1}$ (e.g., upstream device 2 for data flow X) to the ingress port $102_{c1}$ of switch C (e.g., downstream device 2 for data flow X). Data flow X exits switch C through egress port $104_{c1}$. Data flow Y enters switch D (e.g., upstream device 1 for data flow Y) through ingress port $102_{d1}$ and exits through egress port $104_{d1}$ and is routed to ingress port $102_{b1}$ of switch B (e.g., downstream device 1 for data flow Y). Data flow Y travels along a similar path from switch B (e.g., upstream device 2 for data flow Y) to switch C (e.g., downstream device 2 for data flow Y) as discussed above with respect to data flow X, but is routed through switch C to exit at egress port $104_{c2}$ of switch C. Data flow Z enters and exits switch D (e.g., upstream device 1 for data flow Z) through ingress port $102_{d2}$ and egress port $104_{d2}$, respectively. Data flow Z is then routed through the ingress port $102_{e2}$ of switch E (e.g., downstream device 1 for data flow Z) and out the egress port $104_{e1}$ of switch E (e.g., upstream device 2 for data flow Z), and onward to the ingress port $102_{c2}$ of switch C (e.g., downstream device 2 for data flow Z). Similar to data flow X, the network routes data flow Z through the egress port $104_{c1}$ of switch C.

With priority-based flow control (PFC), the HOL blocking issue arises when one flow becomes congested. Using FIG. 1 as an example, assume data flow X becomes congested at switch C. When this occurs, the buffer at egress port $104_{c1}$ will fill faster than packets can be routed to the next device on its route. This in turn will cause the packets of data flow X to back up at the ingress port $102_{c1}$. When the buffer at the ingress port $102_{c1}$ reaches a certain threshold of capacity, switch C will identify data flow X as a congested flow. Switch C would send a message (i.e., a $PFC_{start}$ message) identifying that the data buffer at ingress port $102_{c1}$ is congested and that switch B should stop transmitting packets to the data buffer in switch C at ingress port $102_{c1}$. Upon receipt of the $PFC_{start}$ message, switch B will halt forwarding data packets of data flow X, along with all data packets in the data buffer where data flow X passes before transmission at egress port $104_{b1}$. Therefore, the buffer at egress port $104_{b1}$ will stop transmitting data packets. Because traffic through egress port $104_{b1}$ is halted, this means that packets of data flow Y is also halted, despite data flow Y behaving as expected (i.e., is not congested downstream). This HOL blocking caused by PFC reduces the efficiency of the network by throttling the performance of well-behaving flows (i.e., data flow Y).

As illustrated, switches B and E act both as an upstream device and a downstream device, depending on whether you are looking at the system from the perspective of switches A and D, or switch C. As discussed above, each of the switches A-F may have this dual-nature depending on the direction of traffic flow and your reference point. For ease of discussion, the technology of the present disclosure will be further explained with reference to a single upstream device (switch B of FIG. 1) and a single downstream device (switch C of FIG. 1). The use of these two switches is for illustrative purposes only, and should not be interpreted as limiting the scope of the subject matter disclosed herein to any particular combination of devices.

To minimize the impact of HOL blocking caused by PFC, embodiments of the technology disclosed herein enable congestion isolation in a cost effective manner. FIGS. 2A-2F illustrate an example randomized congestion isolation in accordance with embodiments of the present disclosure. As a non-limiting example, the randomized congestion isolation is illustrated in FIGS. 2A-2F will be discussed with respect to the example HOL blocking scenario discussed with respect to FIG. 1. Although explained with respect to the scenario discussed in FIG. 1, the discussion associated with FIGS. 2A-2F should not be interpreted as limiting the subject matter of the present disclosure. Where like references are used between figures, any discussion with respect to those references should be interpreted as applicable to all like references in other figures. Moreover, a key identifying data packets of different data flows is provided in FIGS. 2A-2F for ease of reference and to help in understanding the technology discussed herein. A key 200 is provided in FIGS. 2A-2F to assist in identifying elements referenced in the present disclosure. For purposes of explanation, the key 200 should be used to interpret FIGS. 2A-2F in reference to data flow X and data flow Y. A designation of the PFC level for triggering PFC is also included in FIGS. 2A-2F, identifying when the PFC would be triggered in the devices.

For illustrative purposes, FIGS. 2A-2F show only one ingress port 102 and one egress port 104 of switch B and switch C, respectively. In various embodiments, the ingress port 102 and the egress port 104 of switches B and C each comprise two data buffers, normal priority queues $102_{norm}$, $104_{norm}$ and congested priority queues $102_{congest}$, $104_{congest}$. Where priority class queues are implemented in the network, normal priority queues $102_{norm}$, $104_{norm}$ of switches B and C may comprise a plurality of priority class queues, each associated with one or more priority classes. As a non-limiting example, normal priority queues $102_{b\_norm}$ may comprise three different queues: a normal low-priority queue; a normal mid-priority queue; and a normal high-priority queue. Upon receipt of data packets at ingress port $102b$ during normal operation, switch B may identify associated class and place the data packet in the proper class-based queue. In some embodiments, each class-priority queue (i.e., normal low-priority, normal mid-priority, normal high-priority) may have a dedicated congested priority queue (e.g., normal low-priority queue/congested low-priority queue, normal mid-priority queue/congested mid-priority queue, etc.). For ease of discussion, normal priority queues $102_{norm}$, $104_{norm}$ shall, respectively, be treated as a single queue for non-isolated traffic (i.e., any traffic not selected for isolation in congested priority queues $102_{congest}$, $104_{congest}$ of switches B and C is placed in normal priority queues $102_{norm}$, $104_{norm}$ of switches B and C, respectively, regardless of non-congested priority class).

The normal priority queues $102_{norm}$, $104_{norm}$ and the congested priority queues $102_{congest}$, $104_{congest}$ of switches B and C may be one or more buffer queues of a set of buffer queues associated with the ingress port 102 and egress port 104 of each switch. In some embodiments, the normal priority queues $102_{norm}$, $104_{norm}$ and the congested queues $102_{congest}$, $104_{congest}$ may be associated together as buffer pairs, and the ingress port 102 and the egress port 104 may comprise one or more buffer pairs. Where priority class queues are implemented in the network, normal priority queues $102_{norm}$, $104_{norm}$ of switches B and C may comprise a plurality of priority class queues, each associated with one or more priority classes. In various embodiments, congested priority queues $102_{congest}$, $104_{congest}$ of switches B and C may also comprise a plurality of priority class queues, each associated with one or more priority classes. In some embodiments, each priority class queue of normal priority queues $102_{norm}$, $104_{norm}$ may have an associated priority class queue of congested queues $102_{congest}$, $104_{congest}$.

A normal priority queue $102_{norm}$, $104_{norm}$ is configured as the data buffer used when no congestion is detected (i.e., normal operation). In various embodiments, the normal priority queues $102_{norm}$, $104_{norm}$ may comprise one or more data buffers, and the one or more data buffers may be co-located on the same memory component or each data buffer may comprise be separate memory components. Congested priority queues $102_{congest}$, $104_{congest}$ are a portion of buffer memory designated to isolate one or more flows to alleviate congestion. In some embodiments, congested priority queues $102_{congest}$, $104_{congest}$ may be a separate data buffer component of the switch, a dedicated portion of a data buffer associated with the ingress port 102, a shared memory pool available to all the ports of a given switch and configured to act as a data buffer, or a combination thereof. The congested priority queues $102_{congest}$, $104_{congest}$ and normal priority queues $102_{norm}$, $104_{norm}$. may be co-located with each other on the same memory component.

For ease of discussion, FIGS. 2A-2F will be discussed by treating normal priority queue $102_{norm}$ and normal priority queue $104_{norm}$ as a single queue, respectively (as discussed above). This is for illustration only and should not be interpreted as limiting the scope of the technology disclosed herein. Where differences arise with embodiments comprising a plurality of queues within normal priority queues $102_{norm}$, $104_{norm}$ the impact of such differences shall be addressed.

Figure 2A:
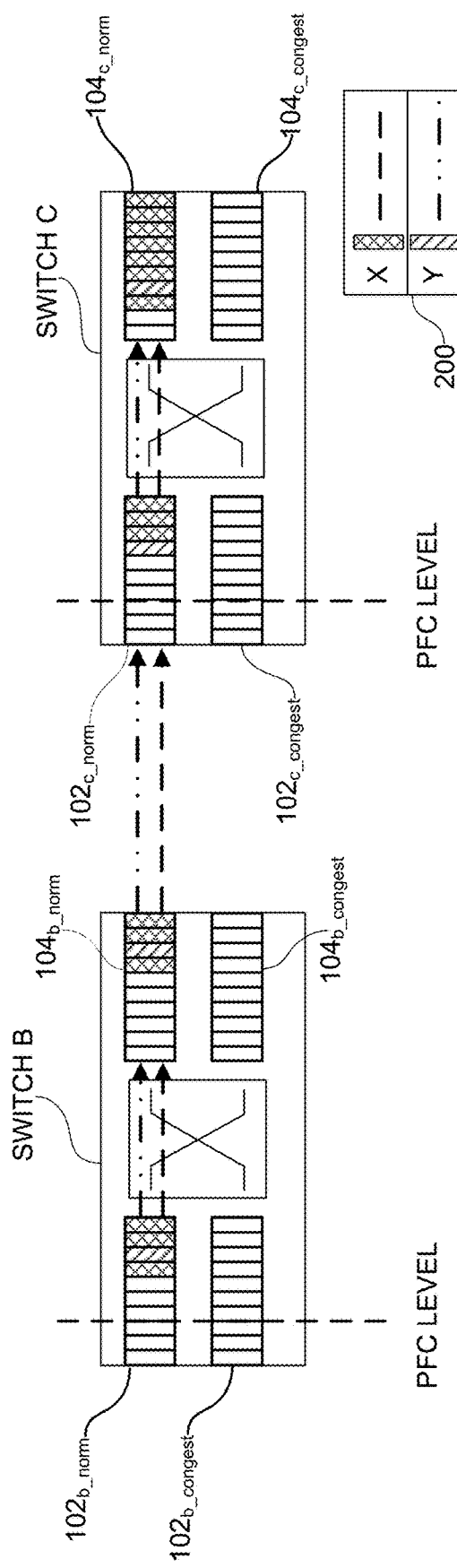
FIG. 2A illustrates a first part of an example congestion isolation procedure in accordance with embodiments of the technology disclosed herein.

During normal operation, the congestion queues $102_{congest}$, $104_{congest}$ are generally unused. Packets received through ingress port 102 of switch B are committed to the normal priority queue $102_{b\_norm}$. Where priority classes are used, switch B may utilize the associated priority class detected. In various embodiments, switch B reads packet header information to determine the data flow and the destination endpoint in order to apply one or more routing tables. As shown in FIG. 2A, switch B identifies that the packets of two different data flows received at an ingress port 102 (represented by the different shaded boxes) are to be routed through switch B's egress port 104, and are therefore queued into normal priority queue $104_{b\_norm}$ associated with the egress port 104. The packets of each data flow are then forwarded to the ingress port 102 of switch C, which decides how to queue the received data packets upon reception. The determination process may be the same or similar to the determination process discussed above with respect to switch B. As illustrated in FIG. 2A, switch C determines that the data packets are to be queued in normal priority queue $102_{c\_norm}$ associated with the ingress port 102 of switch C (i.e., no congestion situation has been detected and operation proceeds under normal conditions). Moreover, switch C determines that data flow X and data flow Y are further determined (by switch C) to be routed to a device further downstream from switch C through the egress port 104 of switch C. In some embodiments, switch C may determine to route the data packets for a particular flow through a different egress port, as explained below with respect to FIG. 3.

While operating normally, the data packets continue to be queued in the normal priority queues of each ingress and egress port of a switch, such as the one or more ports of switches A-F discussed with respect to FIG. 1. However, when a congestion situation is identified, a randomized congestion flow control may be triggered. A variety of parameters may be used to determine congestion. Non-limiting examples of the parameters used include: the depth of data or data packets within an ingress port queue (e.g., normal priority queue $102_{norm}$, $104_{norm}$); the average ingress port queue depth over time; the rate the ingress port queue is being filled; the total buffer utilization within the switch; among others. In various embodiments, more than one parameter is used in determining whether congestion exists. Although the congestion is discussed as occurring at an egress port 104, detecting congestion is generally determined based on data packets "backing up" into one or more queues of the ingress ports 102. This is an indication that the egress port 104 is not forwarding data packets at the same pace as one or more ingress ports 102 is receiving data packets from an upstream device.

As illustrated in FIG. 2A, a congestion situation is present at the switch C. Due to some issue further downstream in the network, normal priority queues $104_{norm}$ of switch C is starting to become saturated (i.e., becoming fully used). Due to this congestion, data packets are beginning to back-up at normal priority queue $102_{c\_norm}$ of switch C. In various embodiments, although not illustrated in FIG. 2A, more than one normal priority queues at different ingress ports 102 of switch C may also be impacted. In such instances, the random congestion isolation discussed is applied to all the impacted ingress ports 102.

Figure 4:
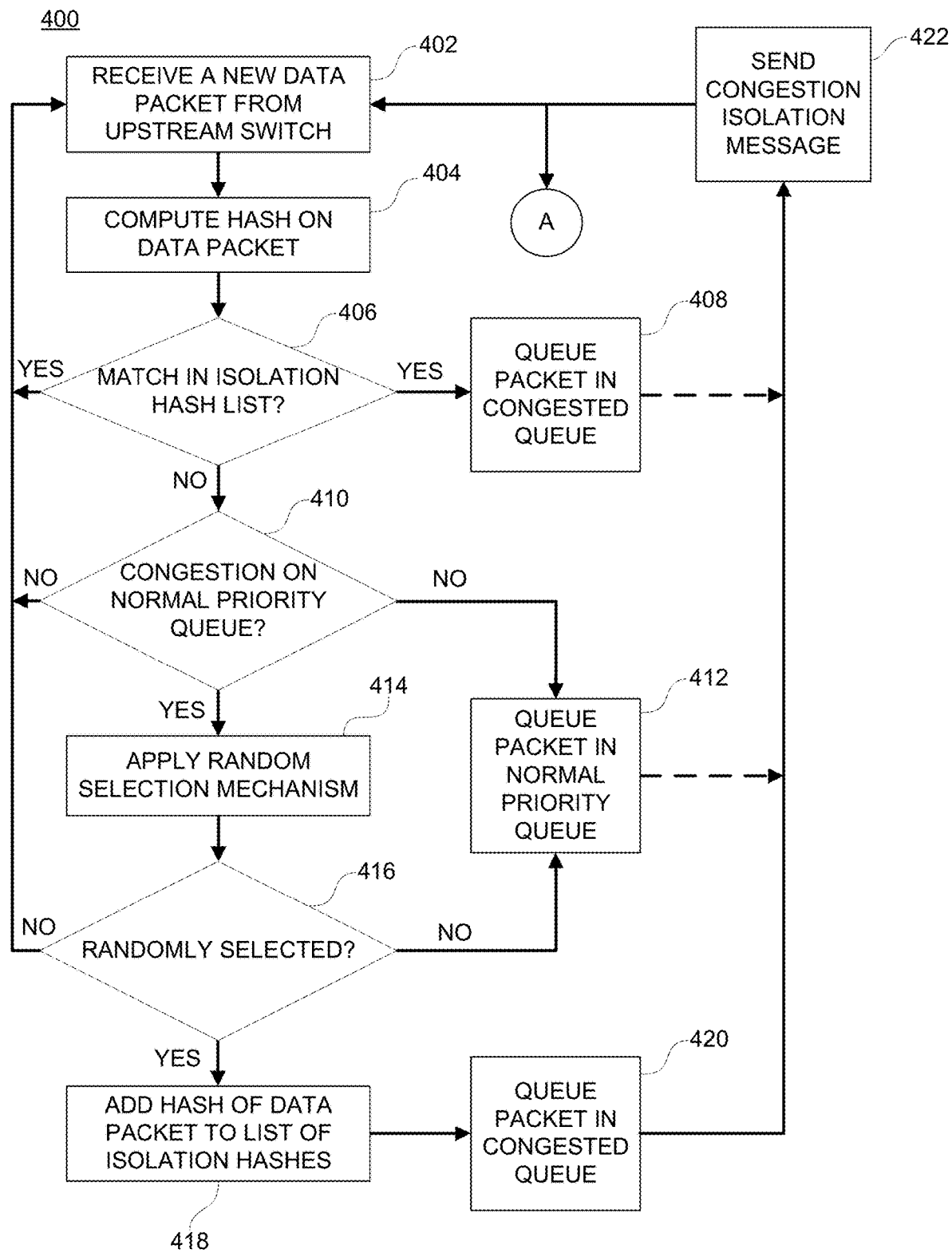
FIG. 4 is an example random congestion isolation process in accordance with embodiments of the technology disclosed herein.

When congestion at an egress port 104 is detected (based on data packets backing up at ingress port 102, as discussed above), switch C randomly determines whether to isolate newly arrived data packets at ingress port 102, in an effort to alleviate the congestion. An example random congestion isolation process 400 is illustrated in FIG. 4. After receiving a new data packet from the upstream device at operation 402, switch C may apply a hash function on the data packet as received at ingress port 102 at operation 404 to generate a hash. Although discussed with respect to applying a hash function, other identification methods may be applied at operations 404 and 406. As non-limiting examples, switch C could compute a checksum, check digit, or any other function useful for identifying data of a fixed size operation 404. In various embodiments, switch C may compute a hash for each data packet it receives independent of whether congestion is detected.

At decision 406, switch C may check the computed hash for the received data packet against a list of isolation hashes. The list of isolation hashes is a collection of one or more hashes for data packets which switch C has already selected for isolation. In various embodiments, the first time process 400 is run, the list of isolation hashes may be a null or some other indication that no values are stored in the list of isolation hashes. In other embodiments, if a switch downstream of switch C implements a congestion isolation procedure in accordance with an embodiment of the present disclosure as well, the list of isolation hashes may contain isolation hashes transmitted to switch C from the downstream device (not pictured in FIG. 4) in a manner similar to that discussed below with respect to operation 422 and FIG. 2B. If a match is found (i.e., the hash matches a hash in the list of isolation hashes), switch C may queue the data packet in congested priority queue $102_{c\_congest}$ at operation 408. By queueing the data packet in the congested priority queue $102_{c\_congest}$, switch C allows data packets of other data flows not selected for isolation by switch C to work through normal priority queue $102_{c\_norm}$, eventually to be routed out of egress port $104_c$ through the normal priority queue $104_{c\_norm}$. In various embodiments, the computed hash for the data packet assists in identifying a bucket within the list of isolation hashes. The list of isolation hashes may comprise a number of buckets, each bucket associated with one or more computed hashes. Switch C may use the computed hash to determine a bucket within the list of isolation hashes to determine if there is a match. Such a situation may occur where many small data flows (i.e., data flows which require a small amount of bandwidth or provide short bursts of data ("mice")) are the cause of the congestion, as opposed to congestion caused by one or more large data flows (i.e., data flows which utilize a large portion of the bandwidth over a longer period of time ("elephants")).

A non-limiting example of an implementation for a list of isolation hashes may be a Boolean array. The Boolean array would encode the list of isolation hashes, having one element for every possible hash value. In various embodiments, a hash in this example is added to the list of isolation hashes by setting the Boolean indexed by the hash to TRUE. Other non-limiting embodiments may use other data structures to realize the list of isolations hashes. Other realizations may store the list of isolation hashes in some data structure other than a Boolean array. Regardless of the implementation, the list of isolation hashes provides a means to determine if a particular hash is a member of the isolation hashes. In some embodiments, switch C may reclassify the data packet, marking the packet as being in a congested priority class.

After queueing the data packet in the congested priority queue $102_{c\_congest}$, switch C may optionally send a congested isolation message (CIM) to switch B at operation 422, as indicated by the reference A of FIG. 4. The CIM serves to inform switch B that switch C has begun to isolate one or more data flows due to congestion developing at the egress port $104_c$ (as detected at ingress port $102_c$), and to indicate which data flows have been selected for isolation. In various embodiments, the CIM may include the list of isolation hashes determined by switch C to assist switch B in identifying the flows being isolated. In some embodiments, the CIM may include additional information to identify packets of the data flow selected for isolation. As a non-limiting example, the CIM may include the first N bits or bytes of the data packet. In addition to sending the CIM to switch B at operation 422 (i.e., indicated by the reference A), switch C returns to option 402 and restarts process 400 on a new data packet. At operation 408, sending the CIM is optionally because in various embodiments switch B may already be aware that data packets matching the hash computed at operation 404 are being isolated (i.e., it already has received the CIM containing the corresponding list of isolation hashes). In such embodiments, switch C may return to operation 402 without proceeding to operation 422.

If no match within the list of isolation hashes is detected (i.e., the hash is different from any of the hashes in the list of isolation hashes or the list of isolation hashes is empty/null), switch C checks to see whether a congestion situation on normal priority queue $104_{c\_norm}$ exists at decision 410. As discussed above, isolation is provided when congestion is detected in a manner like those discussed above with respect to FIG. 1 (i.e., based on detection of data packets backing up at normal priority queue $102_{c\_norm}$ at ingress port $102_c$). Although illustrated and described FIGS. 2A-2F with respect to normal priority queue $102_{c\_norm}$ being congested, any normal priority queue of any ingress port $102_c$ of switch C which sends data packets to egress port $104_c$ may indicate congestion. An example of such a situation is illustrated (and discussed with respect to) below in FIG. 3.

Referring back to FIG. 4, if no congestion at egress port $104_c$ exists (as detected at normal priority queue $104_{norm}$), switch C may queue the data packet in normal priority queue $102_{c\_norm}$ at operation 412. That is, switch C may route and forward the data packets in a normal way. In various embodiments, switch C may optionally send a CIM at operation 422 to switch B after adding a data packet to normal priority queue $102_{c\_norm}$. In some embodiments, switch C may not inform switch B when a data packet is added to normal priority queue $102_{c\_norm}$, instead returning to operation 404 and checking the next received data packet. In still other embodiments, switch C may send the CIM periodically when no congestion is detected at decision 410. Such periodic CIM may assist in maintaining freshness of the isolation actions of switch B and switch C.

If congestion is detected at decision 410 (i.e., the computed hash for the data packet does not match any hashes in the list of hashes, but data packets have backed up at normal priority queue $102_{norm}$), switch C may apply a random selection mechanism at ingress port $102_c$ at operation 414 to determine whether the data packet is going to be selected for isolation. As a non-limiting example, switch C may perform the selection by calculating a randomly generated number and a selection probability for each new data packet before it is queued at the normal priority queue $102_{c\_norm}$. Once a congestion situation in switch C is detected, for each new data packet to be queued at ingress port $102_c$ a random number is calculated, for example a number between 0 and 1. In addition, for each new data packet to be queued at ingress port $102_c$ a probability is calculated which determines the chance the new data packet would be selected for isolation at that time. In various embodiments, the probability function is expressed by a number between 0 and 1, where 0 represents no chance and 1 represents a 100% chance. The probability and the random number calculated for each newly arrived data packet are then compared. If the random number is less than or equal to the probability then the newly received data packet is selected and queued at the congested priority queue $102_{c\_congest}$. If the random number is greater than the probability, then the newly arrived data packet is not selected for isolation and is instead queued in the normal priority queue $102_{c\_norm}$. In other embodiments, switch C may utilize random selection algorithms and mechanisms present within the system for other purposes, such as Active Queue Management mechanisms including, but not limited to, the random early discard (RED) mechanism or weighted RED (WRED) used for TCP signaling, among others.

In various embodiments, switch C may vary the parameters used by the random selection mechanisms. As a non-limiting example, the minimum queue depth threshold at which the random selection begins (i.e., minimum queue depth of the normal priority queue $102_{c\_norm}$ at which isolation selection begins) may be increased or decrease, the maximum queue depth threshold at which the random selection algorithm ends (i.e., maximum queue depth at which the need for isolation is at its greatest) may be increased or decreased, or a combination of both. Other non-limiting examples include: varying the maximum probability (e.g., with respect to the above example algorithm, set the maximum probability at a number other than 1) of a data packet being randomly selected; change the shape of probability increase exponentially rather than linearly; or accounting for a parameter outside the buffer in determining the sampling probability (e.g., total load on the switch); among others. Unlike current approaches which aim to identify the specific congested flow for isolation, embodiments of the technology disclosed herein rely on a random selection regardless of the performance of the flow. The technology of the present disclosure does not rely upon the type of data flow (i.e., elephants, mice, etc.), nor on any specific statistics necessitating additional hardware components and processing capabilities, such as expensive content-addressable memory (CAM). The specific random selection mechanism implemented does not impact the operation of the technology disclosed herein. Embodiments described in the present disclosure are applicable with any random selection mechanism.

If the data packet is not randomly selected at operation 416, switch C may queue the data packet in normal priority queue $102_{c\_norm}$ at operation 412, in the same or similar manner as that described with respect to a data packet being stored after decision 410. Moreover, switch C may also return to operation 402 and begin process 400 again on a newly received data packet. However, if the data packet is randomly selected at operation 416, switch C may add the hash of the data packet to the list of isolation hashes at operation 418. By adding the hash of the data packet to the list of isolation hashes, switch C may be able to identify packets with a matching hash at decision 406 when process 400 is applied to the next data packet received from an upstream device (like switch B) at ingress port $102_c$ of switch C. In various embodiments, adding the hash to the list of isolation hashes may comprise flipping a bit of a Boolean array associated with the hash. As a non-limiting example, adding a hash to the Boolean array may comprise flipping the bit identified by the hash (i.e., the bucket identified by the hash), signaling that packets matching that hash are to be isolated. In some embodiments, adding the hash to the list of isolation hashes may comprise adding the hash to a table listing the various hashes selected for isolation.

After adding the hash to the list of isolations hash at operation 418, switch C may also queue the data packet in the congested priority queue $102_{c\_congest}$ at operation 420, and, in a manner similar to that discussed with respect to operation 408, switch C may send the CIM to an upstream device (e.g., switch B) and begin process 400 again at operation 402 with a newly received data packet.

Figure 2B:
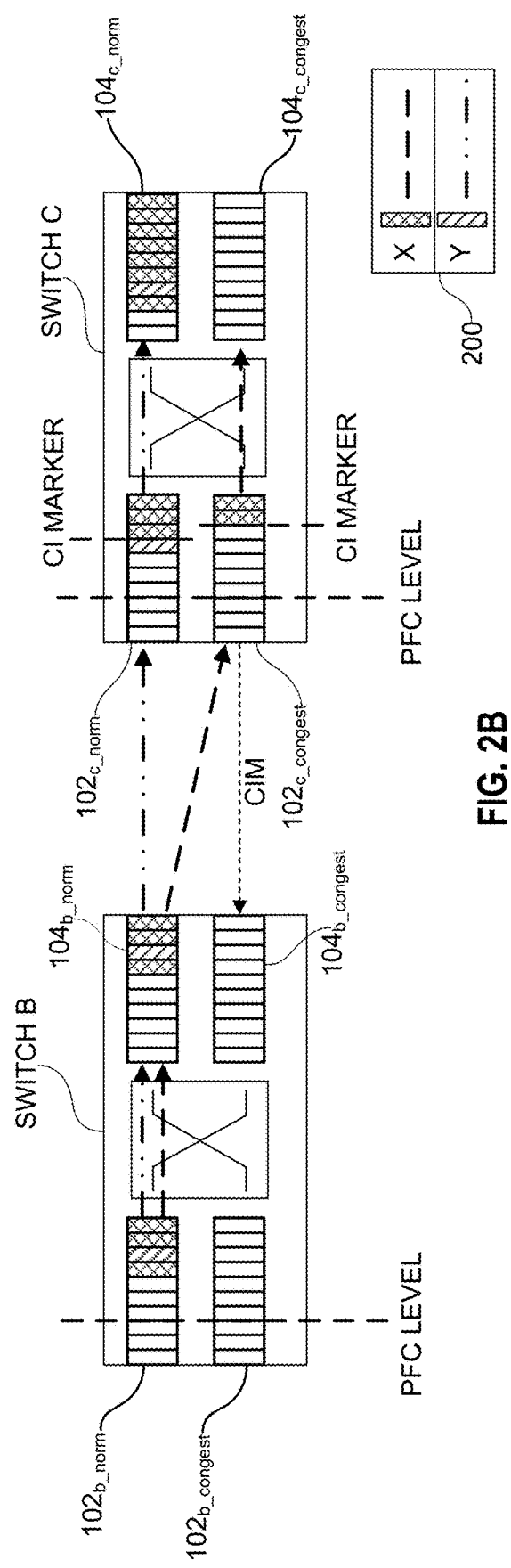
FIG. 2B illustrates a second part of the example congestions isolation procedure in accordance with embodiments of the technology disclosed herein.

FIG. 2B illustrates one of the possible results of process 400A. As illustrated in FIG. 2B, switch C has randomly selected data flow X to isolate in an effort to alleviate congestion. Switch C queues data packets associated with data flow X in congested priority queue $102_{c\_congest}$. In addition, switch C sends a CIM to switch B, informing switch B that switch C has begun to isolate data packets matching a hash in the list of isolation hashes and/or an identifier indicating a particular data flow (here, data flow X). In addition, switch C may include one or more congestion isolation (CI) markers in its queues. Inclusion of CI markers may occur at operations 408 and 412 of process 400. CI markers may be used to ensure that isolated data packets are not sent on from its associated congestion queue. As a non-limiting example, as shown in FIG. 2B switch C may place a CI marker at the location in normal priority queue $102_{c\_norm}$ where the first isolated packet of data flow X would have landed. A matching CI marker may be placed in the congested priority queue $102_{c\_congest}$ ahead of the first isolated packet in the queue. In various embodiments, when the CI marker in the congested priority queue $102_{c\_congest}$ is at the head of the congested queue $102_{c\_congest}$, packets from the congested priority queue $102_{c\_congest}$ are stalled until the matching CI marker in the normal priority queue $102_{c\_norm}$ egresses from the normal priority queue $102_{c\_congest}$, assuring that all of the data packets of data flow X have been forwarded from the normal priority queue $102_{c\_norm}$ before any of the isolated data packets of data flow X are forwarded from the congested priority queue $102_{c\_congest}$. In various embodiments, a separate CI marker pair (not pictured) may be placed in normal priority queue $104_{c\_norm}$ and congested priority queue $104_{c\_congest}$, to ensure that isolated data packets are not forwarded downstream before the data packets in normal priority queue $104_{c\_norm}$ are egressed. In other embodiments, no CI markers are utilized but congested priority queues $102_{c\_congest}$, $104_{c\_congest}$ may be configured to not forward any data packets queued therein until the associated normal priority queue $102_{c\_norm}$, $104_{c\_norm}$ has emptied all the data packets stored therein. In still other embodiments, the queues of ingress port $102_c$ may be configured not to forward data packets until the queues of egress port $104_c$ are emptied.

As illustrated in FIG. 2B, congestion isolation was triggered before the threshold for triggering priority-based flow control (PFC Level) is exceeded. Triggering congestion isolation before priority-based flow control (or other congestion mitigation approach) facilitates the potential for the congestion situation to resolve itself prior to the need for implementing priority-based flow control. In some cases, a short delay in transmitting certain data flows may result in the congestion issue resolving itself, negating the need to trigger the entire congestion mitigation process.

Figure 5A:
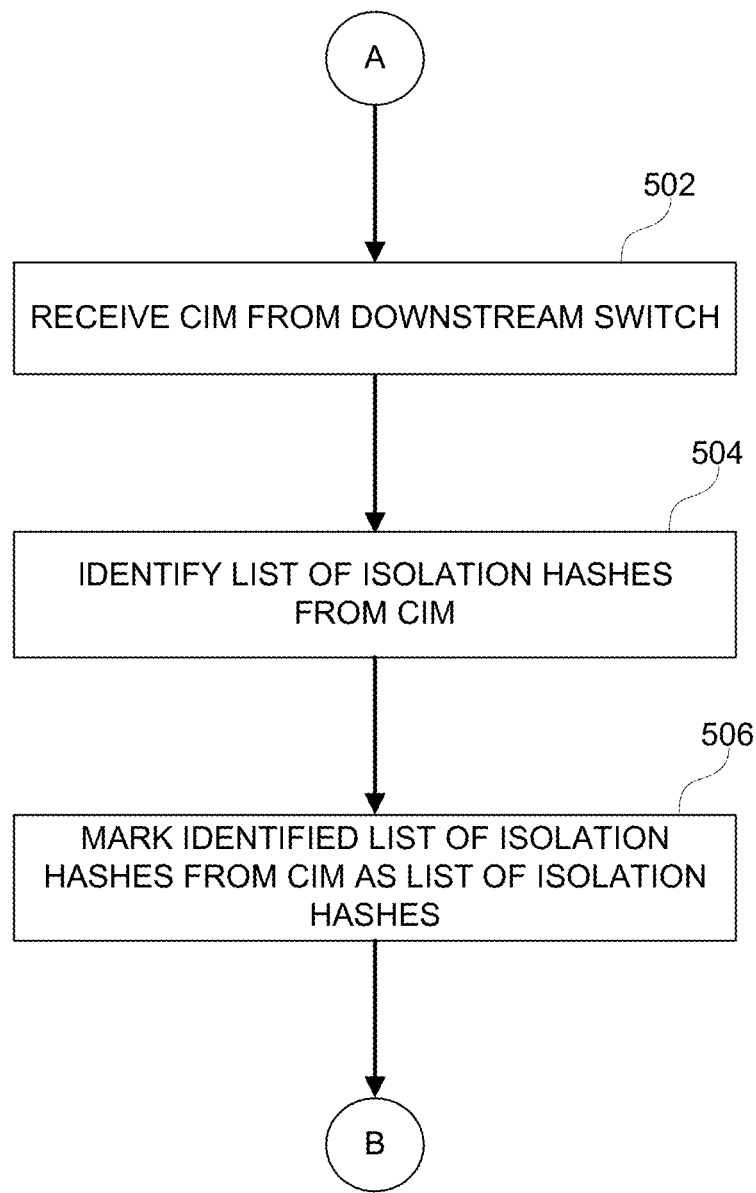
FIG. 5A is a first part of an example isolation process in accordance with embodiments of the technology disclosed herein.
Figure 5B:
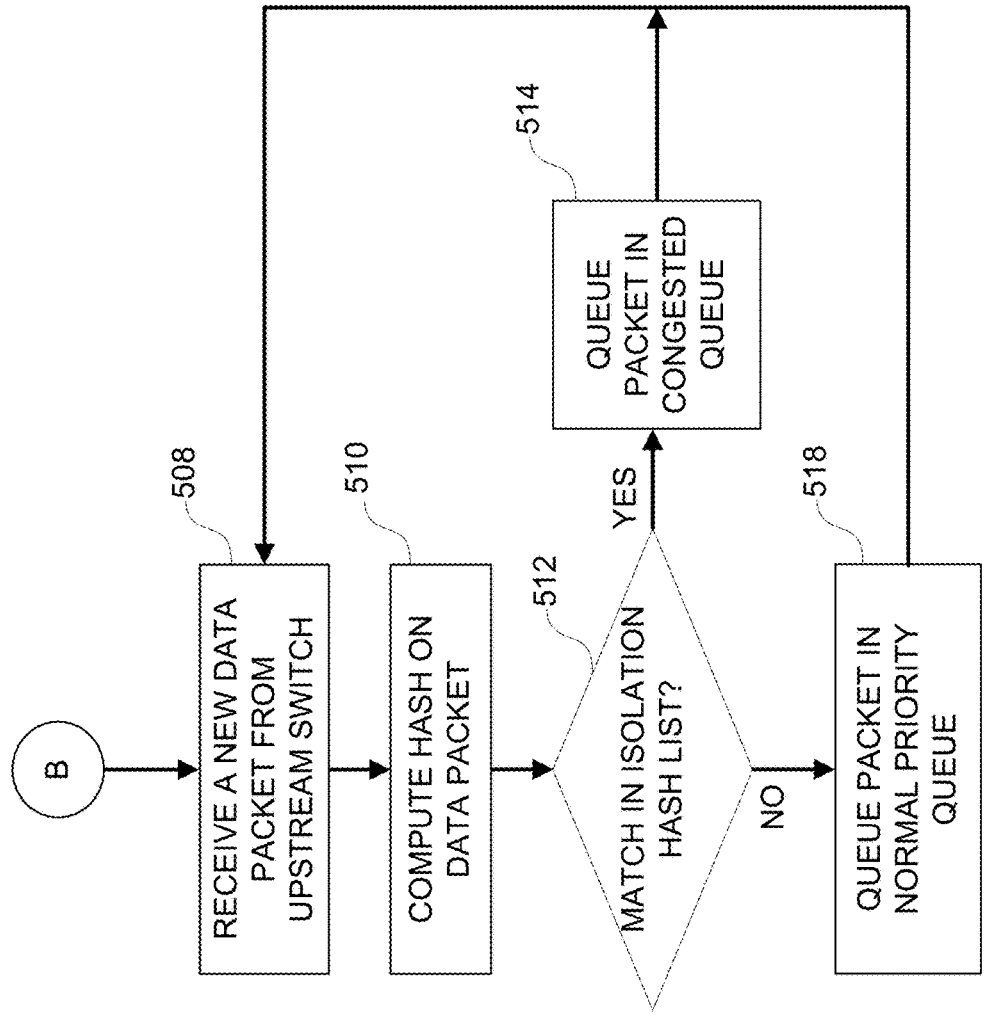
FIG. 5B is a second part of an example isolation process in accordance with embodiments of the technology disclosed herein.

Following receipt of the CIM, switch B can begin to isolate matching data packets in congested queue $104_{b\_congest}$. Using the list of isolation hashes and/or identifying information (e.g., the first N bits or bytes of the data packet discussed above with respect to operation 422 of FIG. 4) included within the CIM, switch B may identify data packets matching those selected by switch C for isolation. An example isolation process 500 in accordance with embodiments of the technology disclosed herein is illustrated in FIGS. 5A and 5B. As illustrated in FIG. 5A, process 500 begins upon receipt of the CIM sent by the downstream device, as discussed with respect to FIG. 4, at operation 502. After receipt, switch B identifies the list of isolation hashes contained in the CIM at operation 504. In various embodiments, identifying the list of isolation hashes may also comprise identifying any other identifying information included in the CIM. At operation 506, switch B marks the list of identified isolation hashes from the CIM as its list of isolation hashes. In this way, switch B can begin to isolate data packets.

As shown in FIG. 5B, after activating switch B's list of isolation hashes, switch B may perform a variation on the isolation process 400 discussed above with respect to FIG. 4. Operations 508-514 may operate in the same or similar manner as that discussed above with respect to operations 402-408 of FIG. 4. If no match is detected at decision 512, switch B may queue the data packet in the normal priority queue $104_{b\_norm}$ and return to operation 508 to check the next packet. However, unlike in process 400, as shown in FIG. 5B switch B may not send any CIMs in various embodiments. In various embodiments, switch B may only send a CIM if switch B detects congestion at its own egress port 104b. In some situations, a short delay in sending packets at one switch may be sufficient to alleviate the issue. By not sending a CIM to any devices upstream from switch B could reduce overhead within the network, impacting the operation of the fewest number of switches within the network necessary to address the situation. In other embodiments, switch B may send a CIM after operation 506 and/or operations 514-518, to propagate the isolation upstream. In some embodiments, switch B may apply operations 508-514 at ingress port 102b in a manner similar to switch C's application of process 400 discussed with respect to FIG. 4 (i.e., switch B may apply operations 508-514 to determine whether to queue a newly received data packet in normal priority queue $102_{b\_norm}$ or congested priority queue $102_{b\_congest}$ at ingress port $102_b$).

In various embodiments, switch B may apply a similar or the same process as process 400 discussed with respect to FIG. 4, when the congestion is detected at egress port 104b (i.e., upstream of switch C), or, independently, at another egress port of switch B. Similarly, in various embodiments switch C may perform the same or similar process as process 500 discussed with respect to FIGS. 5A-5B, when switch C receives a CIM from a downstream device.

The processes 400 and 500 are presented as illustrative examples only and should not be interpreted as limiting the scope of the technology disclosed herein to only those processes. The technology is applicable to other processes for identifying and marking data packets for isolation, as would be understood by a person of ordinary skill in the art.

One possible result of process 500 is illustrated in FIG. 2C. In various embodiments, switch B may use the list of isolation hashes extracted from the CIM to queue data packets matching one of the hashes in the list of isolation hashes (here, the hash associated with data flow X) into congested queue $104_{b\_congest}$ of egress 104 of switch B. When switch B receives packets of data flow X (i.e., operation 508), those packets are can be queued in congested priority queue $104_{b\_congest}$ or, in other embodiments, in congested priority queue $102_{b\_congest}$. Data packets not matching a hash value in the list of isolation hashes (i.e., data packets of data flow Y) are queued in normal priority queue $102_{b\_norm}$; only the packets of data flow X are isolated in congested priority queue $104_{b\_congest}$ in the illustrated example. Therefore, in the event priority-based flow control (or another congestion mitigation approach) is triggered, congested queue $104_{b\_congest}$ can be stalled without impacting normal priority queue $104_{b\_norm}$. Prior to any congestion mitigation being triggered, however, switch B may continue to forward data packets in both normal priority queue $104_{b\_norm}$ and congested queue $104_{b\_congest}$ to an ingress port $102_c$ of switch C, as shown in FIG. 2C. Upon receipt, switch C may execute process 400. In some embodiments, where switch B reclassifies data packets from its native priority class to a congested priority class, upon reception switch C may identify the reclassification and queue the received data packet in congested priority queue $102_{c\_congest}$. In other embodiments, after determining the priority class assigned to the received data packet, switch C may still perform the operations of process 400, in the event the received data packets from switch B (or any other upstream device) were received while the CIM identifying the current list of isolation hashes was in transit. In this way, switch C may increase the probability that data packets which should be isolated are isolated.

As discussed above, with data flow X isolated, the impact of priority-based flow control (or other congestion mitigation approach) applied in the example of FIGS. 2A-2F is reduced. As illustrated in FIG. 2D, when the PFC level is exceeded (either in normal priority queue $102_{c\_norm}$ and congested priority queue $102_{c\_congest}$), the priority-based flow control mechanism may be triggered, sending a $PFC_{start}$ message to switch B. The $PFC_{start}$ message may be the standard PFC message sent when priority-based flow control is implemented, only identifying the congested queue $104_{b\_congest}$ rather than normal priority queue $104_{b\_norm}$. Therefore, because the data packets of the selected flows (here, data flow X) are not queued within normal priority queues $102_{b\_norm}$, $104_{b\_norm}$ the traffic through that queue can continue to be transmitted. Therefore, the HOL blocking issue is mitigated. That is, switch B will stall transmitting the data packets in congested priority queue $104_{b\_congest}$ to switch C.

When the congestion situation has been resolved, switch C may inform switch B to stop isolating the data flows matching the hashes in the list of isolation hashes. As illustrated in FIG. 2E, switch C may send a congestion remediated message (CRM) to switch B. The CRM may include a null list of isolation hashes in some embodiments, may include a message telling switch B to cease isolation in other embodiments, while in still other embodiments the CRM may include any other indication that switch B should cease isolating data packets. In some embodiments, the CRM may be sent before, at the same time, or after a $PFC_{resume}$ message is sent from switch C to switch B according to the priority-based flow control scheme. In such embodiments, congestion isolation can be controlled separately from the congestion mitigation approach being implemented. In some embodiments, the CRM may not be sent until congested priority queue $102_{c\_congest}$ is empty, congested priority queue $104_{c\_congest}$ is emptied, or both queues are emptied. Following receipt of the CRM, switch B may cease queueing data packets in congestion queue $104_{b\_congest}$, instead queueing received data packets into normal priority queue $104_{b\_norm}$. Switch C may cease the isolation before or after the CRM is sent to switch B. Therefore, after switch B stops isolating, the two switches will be operating as normal, as illustrated in FIG. 2F.

As discussed above, FIGS. 2A-2F show only one ingress port 102 and one egress port 104 of switch B and switch C, respectively, for illustrative purposes only. Showing only one ingress and egress port of each switch is purely for ease of discussion, and should not be interpreted as limiting the subject matter of the present disclosure. The discussion with respect to FIGS. 2A-2F is applicable to all ports of a network device, such as the network devices discussed with respect to FIG. 1. Moreover, although discussed with respect to only two data flows, embodiments in accordance with the example illustrated in FIGS. 2A-2F are not limited to only two flows. In various embodiments, switch C (i.e., the downstream device) may randomly select two or more data flows to reclassify into the congested priority class where more than two data flows traverse through a given egress port of the downstream device. In such cases, the CIM may include two or more hashes or other characteristic, one for each of the data flows randomly selected.

Figure 3:
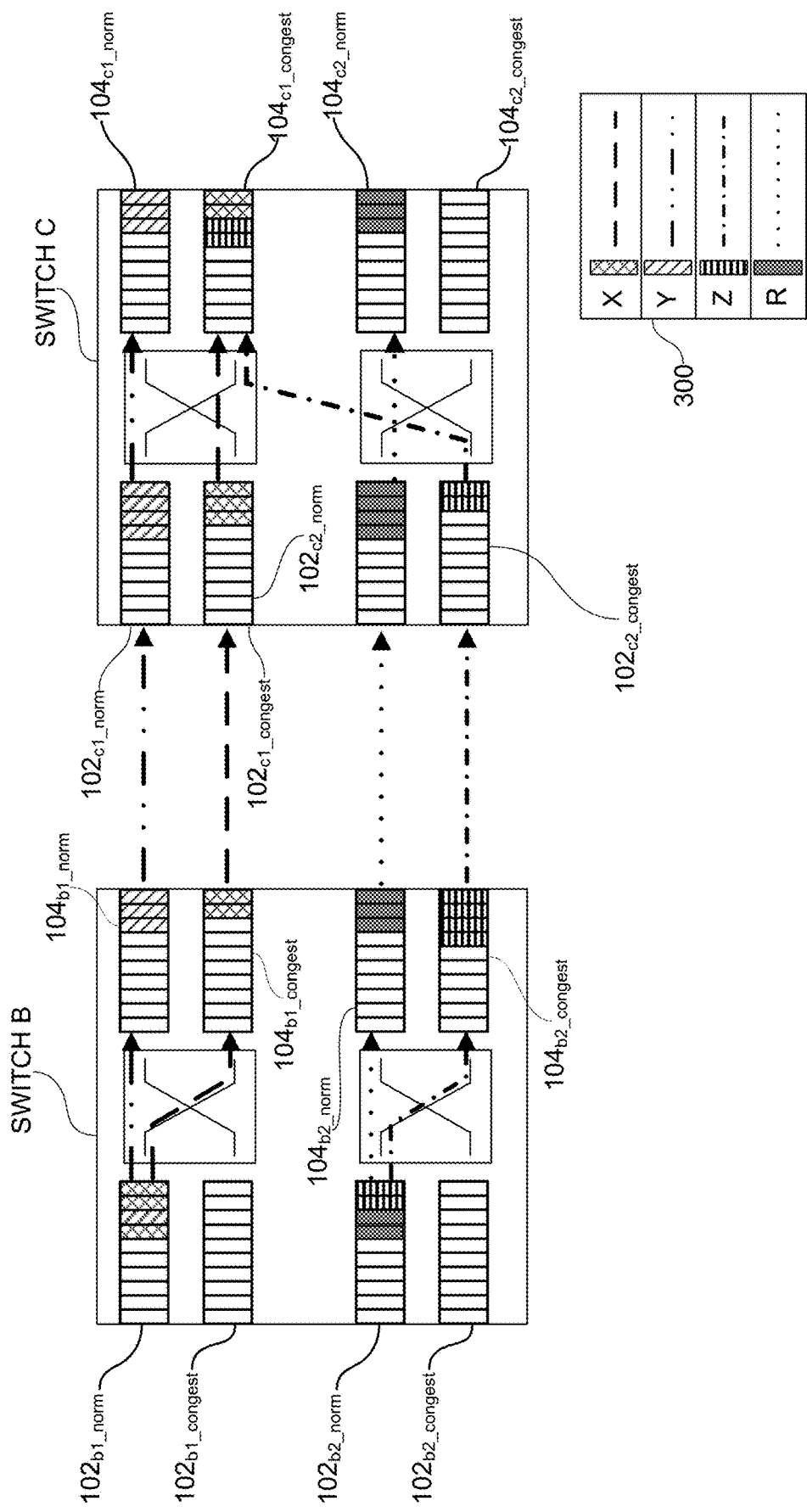
FIG. 3 illustrates another example congestion isolation procedure in accordance with embodiments of the technology disclosed herein.

As discussed above, in various embodiments, the randomly-selected data flows may arrive at the downstream device through two different ingress ports. FIG. 3 illustrates an example scenario where two randomly-selected data flows are received at two different egress ports $102_1$ and $102_2$ in accordance with various embodiments of the technology disclosed herein. For ease of reference, a key 300 identifies data flow Y, data flow X, data flow Z, and data flow R. FIG. 3 shows the elements necessary for explaining embodiments in accordance therewith, and elements of FIGS. 2A-2F not illustrated in FIG. 3 are assumed to be present.

As shown in FIG. 3, switch C receives data flow Y and data flow X through ingress port 102n, like switch C in FIGS. 2A-2F. Switch C also receives data flow R and data flow Z through ingress port $102_{c2}$. Based on the routing protocol employed, switch C identifies that data flow Y, data flow X, and data flow Z are to be forwarded through egress port $104_{c1}$, and data flow R is to be forwarded through egress port $104_{c2}$ of switch C. As illustrated in FIG. 3, switch C identified a congestion issue at normal priority queue $104_{c1\_norm}$, selected data flow X and data flow Z for isolation and sent the CIM to switch B including the list of isolation hashes identifying hashes for data packets of data flow X and data flow Z, similar to the discussion of FIGS. 2A-2F, 4, 5A, and 5B above. Switch B queues data flow X and data flow Z in congested queue $104_{b1\_congest}$ and congested queue $104_{b2\_congest}$, respectively. Switch C also queues newly arrive data packets of data flow X and data flow Z in congested queue $104_{c1\_congest}$. When PFC is triggered, switch B may cease forwarding the congested queues $104_{b1\_congest}$, $104_{b2\_congest}$, while continuing to forward data normal priority queues $104_{b1\_norm}$, $104_{b2\_norm}$.

In various embodiments, a $Cl_X$ marker may be placed at the location where the first isolated packet of data flow X would have landed in normal priority queue $102_{c1\_norm}$, another $Cl_Z$ marker may be placed at the location where the first isolated packet of data flow Z would have landed in normal priority queue $104_{c1\_norm}$, and matching $Cl_X$ marker and $Cl_Z$ marker may be placed in congested queue $102_{c1\_congest}$ and congested queue $102_{c2\_congest}$ ahead of the first isolated packet of data flow X and data flow Z, respectively. In some embodiments, the congested priority data packets (of data flow X and data flow Z) may be stalled until the matching $Cl_X$ marker and $Cl_Z$ marker both egress in a manner similar to that discussed above with respect to FIGS. 2A-2F, such that all the data packets of data flow Y are forwarded from normal priority queue $104_{c1\_norm}$ before any isolated data packet in congested queue $104_{c1\_congest}$ is forwarded. In various embodiments, data flow X and data flow Z may be released from isolation in a staggered manner. For example, if the $Cl_z$ markers for data flow Z both egress but the $Cl_x$ markers for data flow X are still working through the queues, switch C could remove the hash or other identifier in the list of isolation hashes which identifies data packets of data flow Z and send an updated CIM to switch B containing the list of isolation hashes identifying data flow X only. Upon receiving the CIM message, switch B can cease isolating data flow Z data packets (queueing those in normal priority queue $102_{b2\_norm}$) while continuing to isolate data flow X in congested queue $104_{b1\_congest}$.

As discussed above, in various embodiments a number of different priority queues could be included in the normal priority queues of the switches, each priority queue associated with one or more different priority classes. In some embodiments, more flexibility may be provided by including a separate congested queue for each priority queue of the normal priority queues of the switches. As a non-limiting example, the network may include a high priority class, medium priority class, and low priority class, in addition to the congestion priority class. The downstream device may identify the priority class associated with a randomly selected data packet. In various embodiments, the downstream device may maintain a separate list of isolation hashes for each priority queue of the normal priority queues, and another decision may be added in process 400 between decision 406 and operation 408 to determine which priority queue the list of isolation hashes is associated. A similar decision may be added between decision 512 and operation 514 in process 500. When priority-based flow control is triggered in such embodiments, the $PFC_{start}$ message may indicate one or more priority-dependent congested queues, enabling one or more priority-dependent congested queues to be stalled.

In various embodiments, the example randomized congestion isolation discussed above with respect to FIGS. 1, 2A-F, 3, 4, 5A, and 5B may be implemented by a congestion isolation engine of the upstream and/or downstream devices. The congestion isolation engine may be implemented in hardware, software, firmware, or a combination thereof. As a non-limiting example, the congestion isolation engine may implement one or more of the operations discussed above in one or more circuits. As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In various embodiments, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700 discussed below with respect to FIG. 7. In various embodiments, where a circuit is implemented in whole or in part using software, such software instructions may be stored in a non-transitory machine-readable storage medium and executable by one or more processing components, such as the processor types discussed above.

Figure 6:
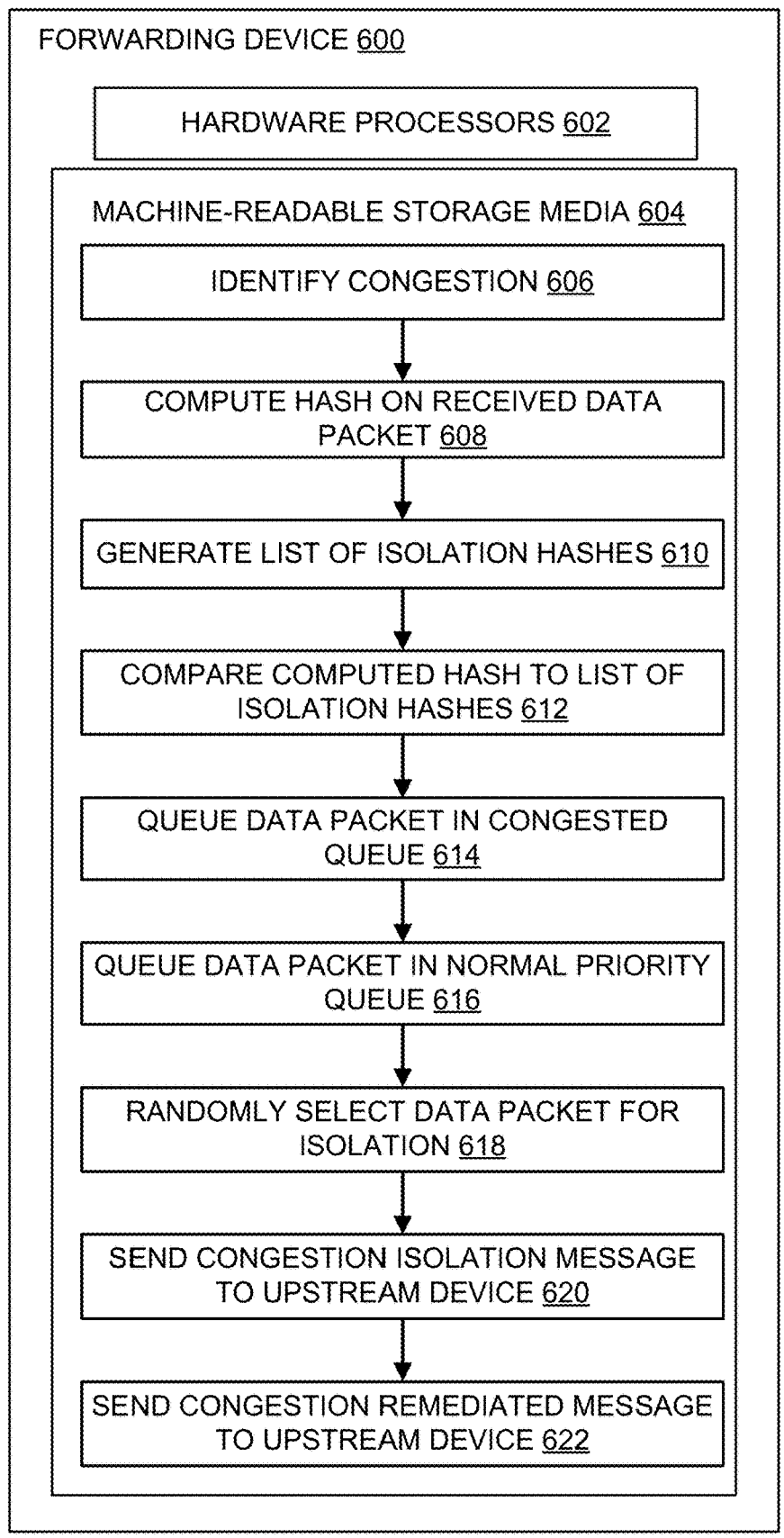
FIG. 6 is an example forwarding device in accordance with embodiments of the technology disclosed herein.

FIG. 6 is an example forwarding device 600 in accordance with embodiments of the present disclosure. Where operations and functionality of forwarding device 600 are similar to those discussed with respect to FIGS. 2A-2F, 3, 4, and/or 5A-5B, the description should be interpreted to apply. In various embodiments, the forwarding device 600 may be a network switch or other data forwarding device implementing the congestion isolation procedure discussed with respect to FIGS. 2A-2F, 3, 4, and 5A-5B. Forwarding device 600 may serve as either a downstream device, upstream device, or both within the network, given the congestion scenario and the network topology. Forwarding device 600 includes hardware processors 602. In various embodiments, hardware processors 602 may be similar to the processors discussed with respect to FIG. 7. In various embodiments, hardware processors 602 may include one or more processors.

Hardware processors 602 are configured to execute instructions stored on a machine-readable medium 604. Machine readable medium 604 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 604 may include various sub-instructions for performing the function embodied by the identified functions. For example, the instruction "Identify Congestion" 606 may include various sub-instructions for identifying congestion on the network communication path, similar to those discussed with respect to FIGS. 2A-2F and current approaches.

The instruction "Computer Hash On Received Data Packet" 608 may include sub-instructions to compute a hash for each data packet as it is received at an ingress port of the forwarding device 600, in a manner similar to that discussed with respect to FIGS. 2A-2F, 3, 4, and 5B.

The Instruction "Generate List of Isolation Hashes" 610 may include sub-instructions for creating a list of isolation hashes to use as discussed with respect to FIGS. 2A-2F, 3, 4, and 5A-5B. In some embodiments, the instruction 610 may include sub-instructions for identifying a list of isolation hashes included within a congestion isolation message from a downstream device and setting the identified list of isolation hashes as the list of isolation hashes for forwarding device 600, similar in manner to that discussed with respect to FIGS. 4 and 5A-5B. In various embodiments, the instruction 610 may include sub-instructions for adding a computed hash for a data packet to an established list of isolation hashes, to a null list of isolation hashes (i.e., where no previous list of isolation hashes has been identified), or a combination thereof as discussed with respect to FIGS. 4 and 5A-5B.

The instruction "Compare Computed Hash To List of Isolation Hashes" 612 may include instructions to determine whether the computed hash matches a hash of the isolation hashes, similar to the manner discussed above with respect to FIGS. 2A-2F, 3, 4 and 5A-5B.

The instruction "Queue Data Packet In Congested Queue" 614 may include sub-instructions for sending the received data packet to a congested queue, similar to the discussed above with respect to FIGS. 2A-2F, 3, 4 and 5A-5B. Some embodiments of instruction 614 may include sub-instructions to identify an egress port which is congested and determine whether to queue the data packet in the congested queue of the impacted egress port or the congested queue of the ingress port which received the data packet, similar to the manner discussed with respect to FIGS. 2A-2F, 3, 4, and 5A-5B. In various embodiments, the instruction 614 may include sub-instructions for determine which congested queue of a plurality of congested queues associated with different priority queues in which to queue the data packet, similar to the priority-dependent congested queue embodiments discussed above.

The instruction "Queue Data Packet In Normal Priority Queue" 616 may include sub-instructions for sending the received data packet to a normal priority queue, similar to the discussed above with respect to FIGS. 2A-2F, 3, 4 and 5A-5B. In various embodiments, the instruction 616 may include sub-instructions for determine which normal priority queue of a plurality of normal priority queues associated with different priority classes in which to queue the data packet, similar to the priority-dependent congested queue embodiments discussed above.

The instruction "Randomly Select Data Packet For Isolation" 618 may include sub-instructions for performing the random selection process discussed with respect to FIGS. 2A-2F, 3, 4 and 5A-5B.

The instruction "Send Congestion Isolation Message to Upstream Device" 620 may include sub-instructions for generating a congestion isolation message in a manner similar to that discussed above with respect to FIGS. 2A-2F, 3, 4 and 5A-5B. In various embodiments, the instruction 620 may include sub-instructions to send a congestion isolation message after every decision on a received data packet, after a new data packet is queued in a congested queue and/or a normal priority queue, or when a new hash is added to the list of isolation hashes, in a manner similar to that discussed with respect to FIGS. 2A-2F, 3, 4 and 5A-5B.

The instruction "Send Congestion Remediated Message to Upstream Device" 622 may include sub-instructions to generate and send a congestion remediated message in a manner similar to that discussed above with respect to FIGS. 2A-2F, 3, 4 and 5A-5B.

Through embodiments of the present disclosure congestion isolation can be accomplished in a cost-effective manner. By avoiding the need to track statistics or identify specific data flows, no dedicated CAMs or other extra memory and/or processing resources to isolate data flows to address congestion.

As discussed above, embodiments of the present disclosure are compatible with priority-based flow control approaches, enhancing the effectiveness of priority-based flow control without modifying the priority-based flow control scheme implemented. A person of ordinary skill in the art would understand that priority-based flow control and the technology disclosed herein are complimentary functions, but separate. As such, although discussed with respect to PFC-enabled devices, that should not be interpreted as limiting the scope of the technology to only PFC-enabled network environments. For example, the technology disclosed herein may be used in networks employing a credit-based queueing technique (e.g., InfiniBand), stop-and-wait protocols (e.g., Fibre Channel over Ethernet (FCoE)), or Ethernet Pause, among others. A person of ordinary skill in the art would understand the applicability of the present disclosure for avoiding issues related to congestion mitigation approaches. Moreover, a person of ordinary skill in the art would understand that, in some embodiments, the technology disclosed herein may be used in lieu of other congestion mitigation approaches (e.g., priority-based flow control, credit-based queueing, etc.). The effectiveness of such embodiments is dependent on implementation design decisions within the skill of an ordinary practitioner.

Figure 7:
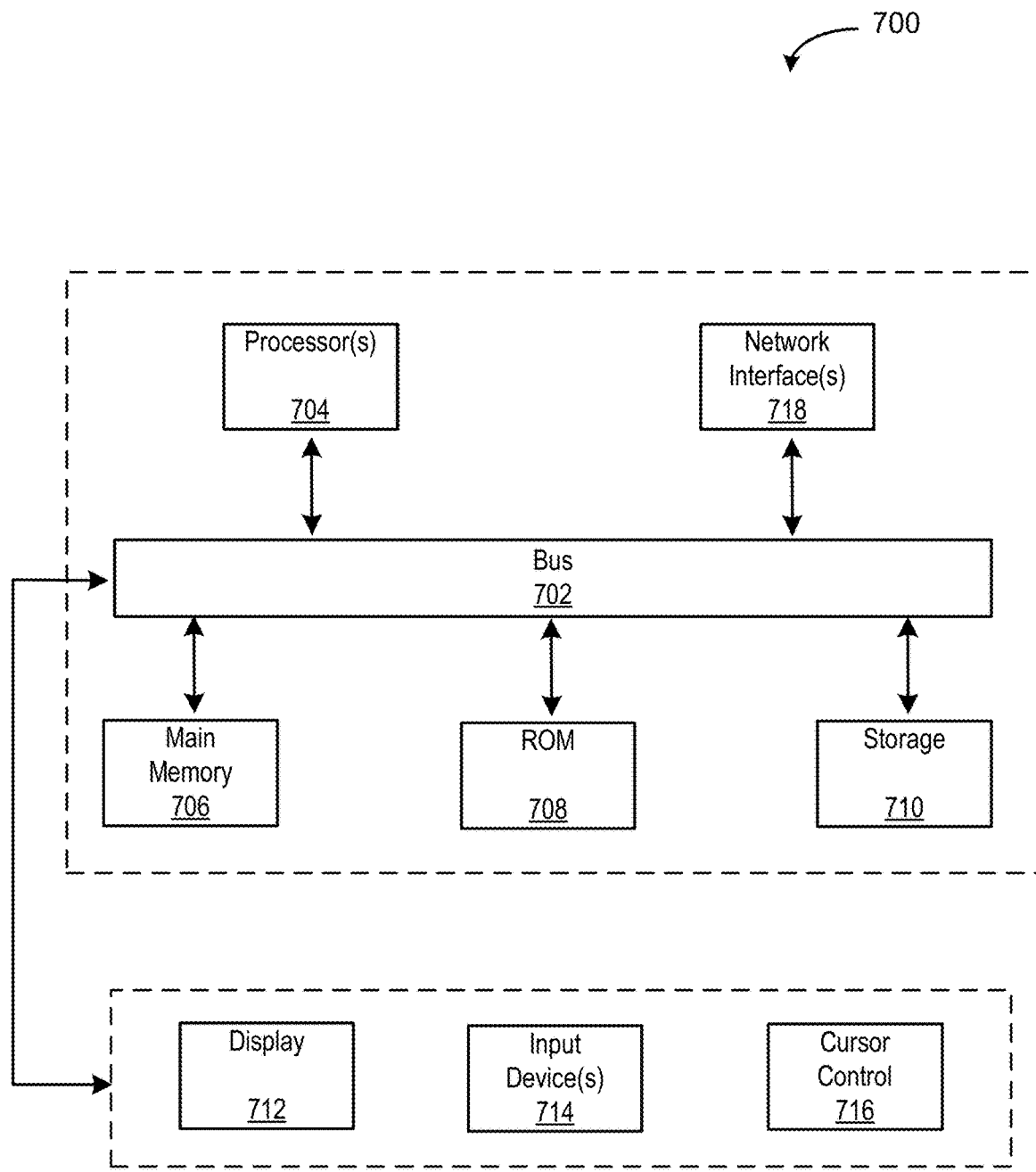
FIG. 7 is an example computing system in which embodiments described in the present disclosure may be implemented.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors. In various embodiments, the one or more hardware processors 704 may execute non-transitory machine-readable instructions to perform the various functions of the embodiments discussed with respect to FIGS. 1, 2A-2F, 3, 4, and 5A-5B.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 802 for storing information and instructions.

The computer system 700 may further include a display 712, input device 714, and/or a cursor control 816 coupled to bus 702 for displaying, communicating, and entering information and/or commands. In some embodiments, the same direction information and command selections as cursor control may be implemented via receiving touches on a touch screen without a cursor. The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. In various embodiments, such instructions may be similar to those discussed with respect to FIG. 6. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702 for enabling two way communication with one or more networks over one or more network links. For example, communication interface 718 may be an integrated services digital network (ISDN) card, cable modem, satellite modem, a modem to provide a data communication connection to a corresponding type of telephone line, a local area network (LAN), a wide area network, or one or more types of wireless communication links.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   identifying, by a downstream device, congestion at an egress port of the downstream device;
   computing, by the downstream device, a hash for a first data packet received at an ingress port of the downstream device;
   comparing, by the downstream device, the computed hash against a list of isolation hashes, the list of isolation hashes comprising one or more previous hashes associated with a data packet selected to be isolated;
   in response to identifying a match between the computed hash and a previous hash of the list of isolation hashes, queueing, by the downstream device, the first data packet in a congested queue of the ingress port of the downstream device;
   in response to determining no match between the computed hash and any of the one or more previous hashes of the list of isolation hashes, applying, by the downstream device, a random selection mechanism to the first data packet; and
   in response to the first data packet being selected for isolation according to the random selection mechanism:
      queueing, by the downstream device, the first data packet in the congested queue of the ingress port of the downstream device;
      adding, by the downstream device, the computed hash for the first data packet to the list of isolation hashes to create an updated list of isolation hashes; and
      sending, by the downstream device, a congestion isolation message to an upstream device, the congestion isolation message including the updated list of isolation hashes
   in response to the first data packet not being selected for isolation according to the random selection mechanism, sending, by the downstream device, a congestion isolation message to the upstream device, the congestion isolation message including the list of isolation hashes.

2. The method of claim 1, wherein identifying congestion at the egress port comprises detecting, by the downstream device, a back-up of data packets in a normal priority queue of the ingress port.

3. The method of claim 1, comprising, in response to the first data packet not being selected for isolation according to the random selection mechanism, queueing, by the downstream device, the first data packet in a normal priority queue of the ingress port of the downstream device.

4. The method of claim 1, wherein a normal priority queue comprises a plurality of normal priority queues associated with the ingress port, and queueing the first data packet in the normal priority queue comprises determining a first normal priority queue of the plurality of normal priority queues associated with a data flow of the first data packet.

5. The method of claim 1, wherein the congested queue comprises a plurality of congested queues associated with the ingress port, and queueing the first data packet in the congested queue comprises determining a first congested queue of the plurality of congested queues associated with the ingress port associated with a data flow of the first data packet.

6. The method of claim 1, comprising generating, by the downstream device, the list of isolation hashes.

7. The method of claim 6, wherein generating the list of isolation hashes comprises:
   receiving, by the downstream device, a downstream congestion isolation message indicating congestion at a forwarding device downstream of the downstream device;
   identifying, by the downstream device, a received list of isolation hashes from the received downstream congestion isolation message; and
   setting, by the downstream device, the received list of isolation hashes as the list of isolation hashes.

8. The method of claim 1, wherein the list of isolation hashes is encoded as a Boolean array.

9. The method of claim 1, comprising sending, by the downstream device, a congestion remediated message in response to determining that congestion no longer exists at the egress port.

10. The method of claim 1, wherein queueing the first data packet in the congested queue of the ingress port of the downstream device comprises:
    setting, by the downstream device, a first congestion isolation marker at a position in a normal priority queue of the ingress port where the first data packet would have been placed in the normal priority queue of the ingress port; and
    setting, by the downstream device, a second congestion isolation marker at a position in the congested queue of the ingress port directly in front of where the first data packet is queued.

11. The method of claim 1, further comprising:
    receiving, by the downstream device, a second data packet at a second ingress port of the downstream device;
    computing, by the downstream device, a hash for the second data packet received at the second ingress port of the downstream device;
    comparing, by the downstream device, the computed hash for the second data packet against the list of isolation hashes;
    in response to determining no match between the computed hash for the second packet and any of the one or more previous hashes of the list of isolation hashes, applying, by the downstream device, a random selection mechanism to the second data packet; and
    in response to the second data packet not being selected for isolation according to the random selection mechanism, queueing, by the downstream device, the second data packet in a normal priority queue of the second ingress port of the downstream device.

12. A network switch, comprising: a plurality of ingress ports, each ingress port comprising a normal priority queue and a congested priority queue; a plurality of egress ports, each egress port comprising a normal priority queue and a congested priority queue; and a congestion isolation engine configured to: identify congestion at a first egress port of the plurality of egress ports, the normal priority queue of the first ingress port comprises a plurality of normal priority queues associated with the first ingress port and queueing a first data packet in the normal priority queue of the first ingress port further comprises determining a first normal priority queue of the plurality of normal priority queues associated with a data flow of the first data packet; compute a hash for the first data packet received at a first ingress port of the plurality of egress ports; compare the computed hash against a list of isolation hashes, the list of isolation hashes comprising one or more previous hashes associated with an isolated data packet; in response to identifying a match between the computed hash and a previous hash of the list of isolation hashes, queueing the first data packet in a congested queue of the first ingress port; in response to determining no match between the computed hash and any of the previous hashes of the list of isolation hashes, applying a random selection mechanism to the first data packet; and in response to the first data packet being selected for isolation according to the random selection mechanism: queueing the first data packet in the congested queue of the first ingress port; adding the computed hash for the first data packet to the list of isolation hashes to create an updated list of isolation hashes; and sending a congestion isolation message to an upstream device, the congestion isolation message including the updated list of isolation hashes.

13. The network switch of claim 12, wherein the congestion isolation engine comprises non-transitory machine-readable instructions executable by one or more processors of the network switch.

14. The network switch of claim 12, wherein the congestion isolation engine is configured to generate the list of isolation hashes.

15. The network switch of claim 12, the congestion isolation engine configured to:
  receive, by the downstream device, a downstream congestion isolation message indicating congestion at a forwarding device downstream of the downstream device;
  identify, by the downstream device, a received list of isolation hashes from the received downstream congestion isolation message; and
  set, by the downstream device, the received list of isolation hashes as the list of isolation hashes.

16. The network switch of claim 12, wherein the first data packet is a first post-congestion identification packet, and wherein the congestion isolation engine is configured to generate a null list of isolation hashes.

17. A system, comprising: a first forwarding switch comprising: a plurality of ingress ports, each ingress port comprising a normal priority queue and a congested priority queue; a plurality of egress ports, each egress port comprising a normal priority queue and a congested priority queue; and a first congestion isolation engine configured to: identify congestion at a first egress port of the plurality of egress ports, the normal priority queue of the first ingress port comprises a plurality of normal priority queues associated with the first ingress port and queueing a first data packet in the normal priority queue of the first ingress port further comprises determining a first normal priority queue of the plurality of normal priority queues associated with a data flow of the first data packet; compute a hash for the first data packet received at a first ingress port of the plurality of egress ports; compare the computed hash against a list of isolation hashes, the list of isolation hashes comprising one or more previous hashes associated with an isolated data packet; in response to identifying a match between the computed hash and a previous hash of the list of isolation hashes, queueing the first data packet in a congested queue of the first ingress port; in response to determining no match between the computed hash and any of the previous hashes of the list of isolation hashes, applying a random selection mechanism to the first data packet; and in response to the first data packet being selected for isolation according to the random selection mechanism: queueing the first data packet in the congested queue of the first ingress port; adding the computed hash for the first data packet to the list of isolation hashes to create an updated list of isolation hashes; and sending a congestion isolation message the congestion isolation message including the updated list of isolation hashes.

18. The system of claim 17, comprising a second forwarding switch comprising:
  a plurality of ingress ports, each ingress port comprising a normal priority queue and a congested priority queue;
  a plurality of egress ports, each egress port comprising a normal priority queue and a congested priority queue;
  a second congestion isolation engine configured to:
    receive the congestion isolation message sent by the first forwarding switch;
    identify the list of isolation hashes in the congestion isolation message;
    set the received list of isolation hashes from the first forwarding switch as a list of isolation hashes for the second forwarding switch;
    compute a hash for a first data packet received by a first ingress port of the second forwarding switch;
    compare the computed hash for the first data packet received by the first ingress port of the second forwarding switch against the list of isolation hashes for the second forwarding switch;
    in response to identifying a match between the computed hash for the first data packet received by the first ingress port of the second forwarding switch and a hash of the list of isolation hashes of the second forwarding switch based on the received list of isolation hashes, queueing the first data packet received by the first ingress port of the second forwarding switch in the congested queue of an ingress port configured to forward the first data packet to the first forwarding switch; and
    in response to determining no match between the computed hash and any of the hashes of the list of isolation hashes for the second forwarding switch, queueing the first data packet received by the first ingress port of the second forwarding switch in a normal priority queue of the first ingress port,
  wherein upon receipt of a priority-based flow control message from the first forwarding switch indicating a egress congested queue of the egress port configured to forward the first data packet to the first forwarding switch, the second forwarding device is configured to cease forwarding data packets from the egress congested queue of the egress port configured to forward the first data packet while continuing to forward data packets from one or more normal priority queues of the egress port configured to forward data packets to the first forwarding device.

* * * * *